Feb. 26, 1963     L. L. POHL     3,079,126
TURBINE SYSTEMS

Filed April 29, 1960     10 Sheets-Sheet 1

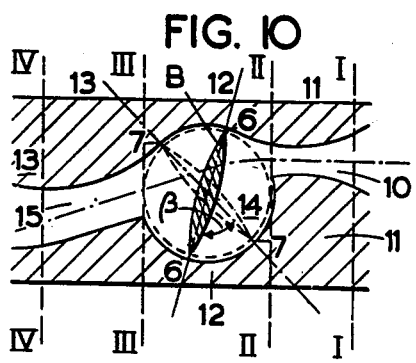
FIG. 10
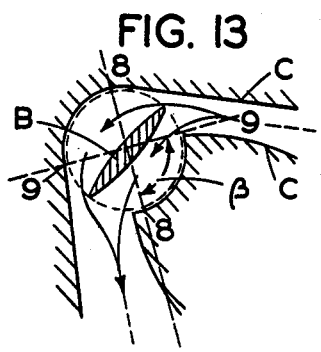
FIG. 13
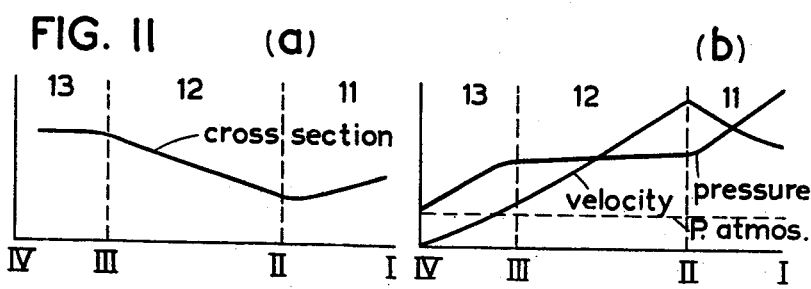
FIG. 11 (a) (b)
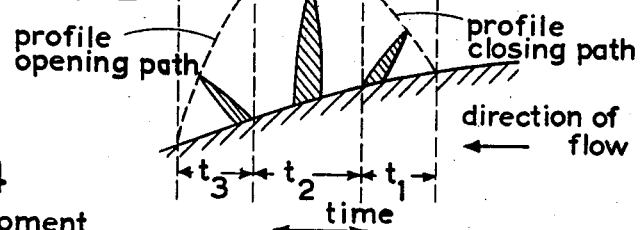
FIG. 12
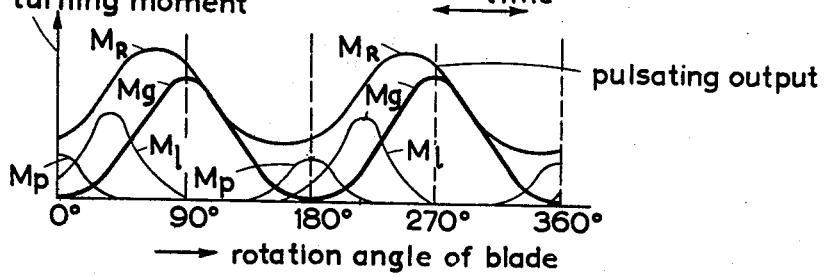
FIG. 14

Feb. 26, 1963 L. L. POHL 3,079,126
TURBINE SYSTEMS
Filed April 29, 1960 10 Sheets-Sheet 5

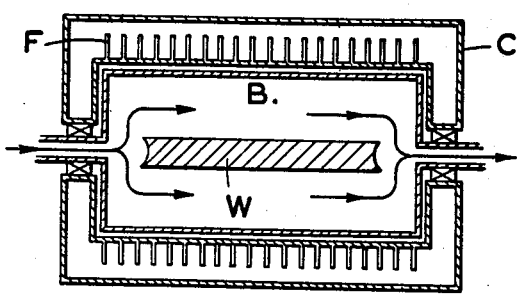
FIG. 20
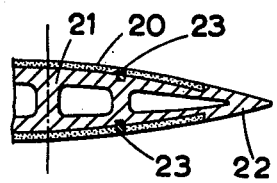
FIG. 23
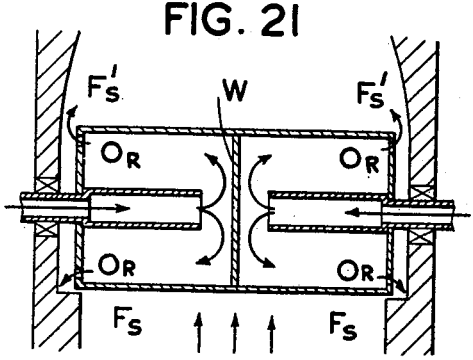
FIG. 21
FIG. 24
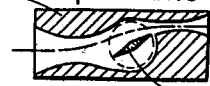
FIG. 26
Miniaturization
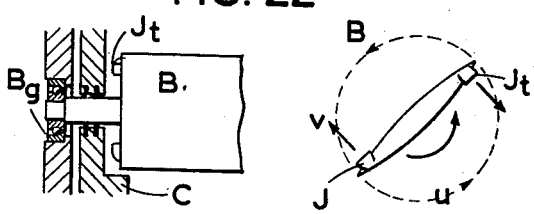
FIG. 22
FIG. 27
Supersonic
FIG. 25 (a)
(b)

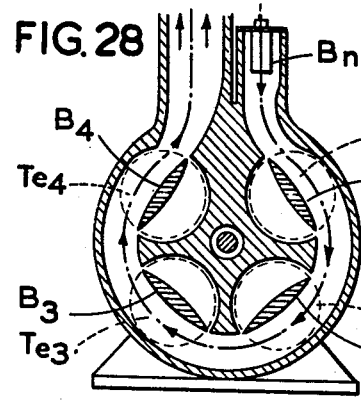
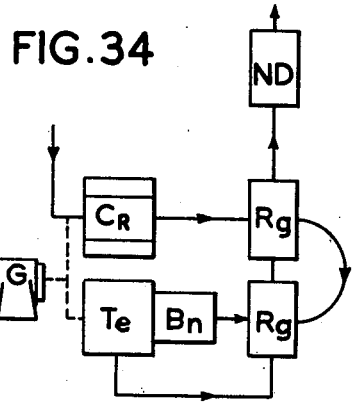
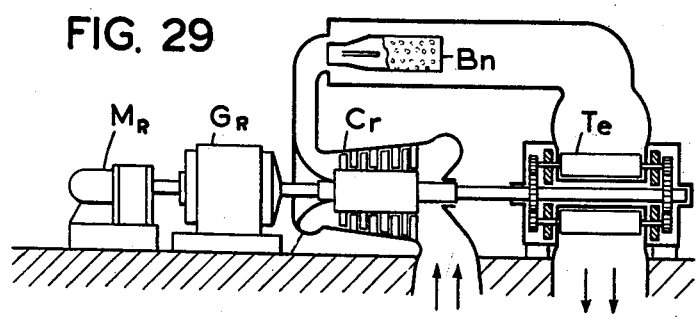
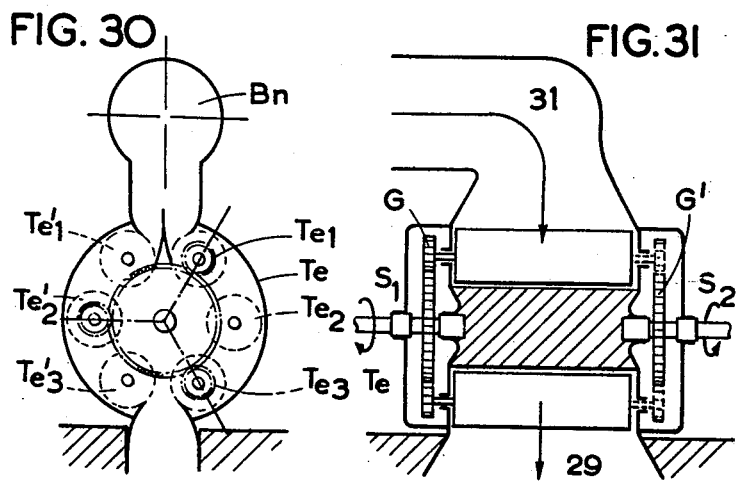

Feb. 26, 1963  L. L. POHL  3,079,126
TURBINE SYSTEMS
Filed April 29, 1960  10 Sheets-Sheet 8

Feb. 26, 1963 L. L. POHL 3,079,126
TURBINE SYSTEMS
Filed April 29, 1960 10 Sheets-Sheet 10
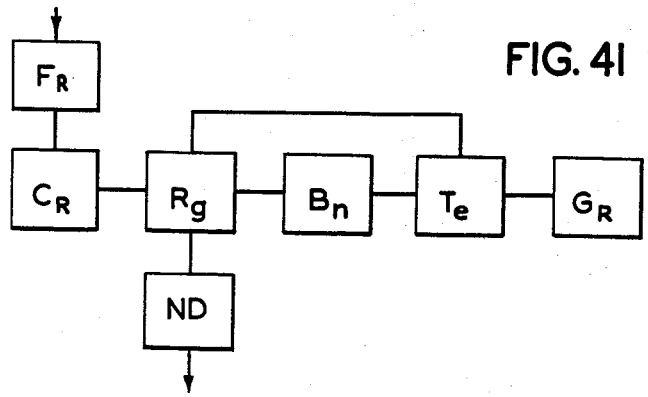
FIG. 41
FIG. 42
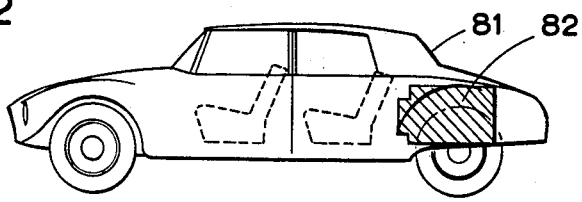
FIG. 44
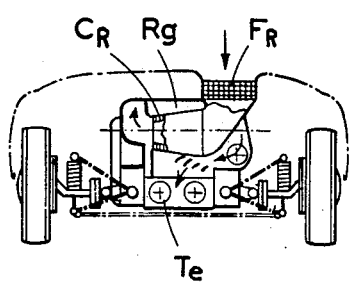
FIG. 43
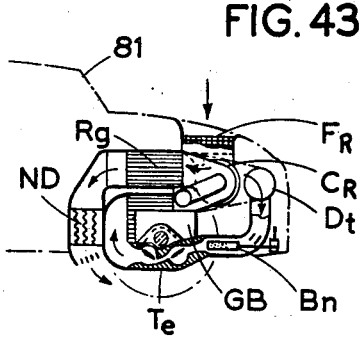

United States Patent Office 3,079,126
Patented Feb. 26, 1963

3,079,126
TURBINE SYSTEMS
Lothar L. Pohl, Toronto, Ontario, Canada, assignor of fifty-one percent to Specialized Patents Sales and Developments Limited, Toronto, Ontario, Canada, a company of Canada
Filed Apr. 29, 1960, Ser. No. 25,657
Claims priority, application Canada May 5, 1959
13 Claims. (Cl. 253—1)

This invention relates to an energy conversion device for converting kinetic energy possessed by a rapidly moving fluid medium into mechanical energy, and is particularly concerned with a novel design of turbine unit for achieving this result.

Since its inception the turbine art has followed a relatively narrow path so far as design is concerned and certain classical features are present in each of the turbines currently in use. Chief amongst these are axial flow of the fluid medium with relation to the rotating or driven structure; the presence of alternating groups of fixed and rotating turbine blades disposed in the flow path, which, by its very nature, must be annular in form so that these blades are always positioned at the periphery of a rotating disc and the large number of such alternating sets of rotating and stationary blades needed to achieve optimum utilization of the kinetic energy of the gases, etc.

These characteristic features have meant that the rotating mass of the turbine is large, and that, in the low pressure stages at least, the turbine blades are displaced from their axis of rotation to such an extent that very large centrifugal forces are at work upon them tending to loosen them bodily from their roots. But above all they have dictated that a considerable amount of extremely precise casting and machining is necessary in the production of a turbine keeping the price of the machinery high. Especially is this true in the case of machinery required to deliver a high power output where due to the large volume of gas which must be handled the turbine diameter becomes very large, and in these fields particularly the gas turbine has not proved able to compete with the diesel engine or with the steam turbine both of which are able to deliver a given unit of power from a far lower weight of generating machinery.

Much of the machining is involved in the turbine blades themselves whose contours have become very involved in an endeavour to attain maximum efficiency and many of the modern blades change their essential function over their radial length with the lower or root portion of the blade being primarily in the form used in an impulse turbine, and the extremity of the blade being of the shallower form used in the reaction turbine. As stated above, a large number of stages and hence an extremely high number of blades are used each of which must be accurately positioned and firmly attached to the rotor and moreover must be made of a material suitable for withstanding very high temperatures, and sometimes extreme corrosive effects particularly if more power is to be obtained from any given turbine without increasing its size.

The above strictures on turbine design have brought about a stagnation point in the development of the gas turbines with the broad design concepts seemingly incapable of further development so that the only creative work now being done in the turbine field appears to be related to what are essentially secondary features, for instance, the metallurgy of the turbine blades, etc.

The invention disclosed in the present specification represents a radical departure from the narrow confines of classical design and is principally concerned with a turbine unit which has a comparatively lower moment of inertia, is easier and less expensive to produce than present designs, has little or no tendency to vibrate, and does not require as much costly machining and has a high power output per unit of weight of machinery.

Modern turbines, due to their basic operating principles are of circular cross-section and this has frequently proved an undesirable limitation in the housing of turbines since it frequently happens that the space which would be most suitable for housing the turbine is not of circular cross-section and correspondingly space must either be wasted or the design must be extensively modified to accommodate the circular turbine.

The novel turbine structure of the present invention is characterized by an essentially flattened cross-section of generally rectangular form and has the advantage that further stages may be added either by lengthening any given cross-section or by increasing the cross-section without any appreciable increase in the length of the machine.

The power/weight limitation of conventional turbines mentioned above means that it has not proved practical as yet to design a small size turbine of sufficient power to be housed in small vehicles, for example the automobile, though it is known that work is proceeding along these lines. The present turbine is particularly adaptable for small design and readily lends itself to miniaturization opening up large new fields to the turbine system.

In its basic concept the present invention is essentially an energy conversion device for converting at least a portion of the kinetic energy possessed by a moving stream of a fluid medium into mechanical energy comprising a casing, means defining a flow passage for said moving stream through said casing, a single blade of symmetrical aerodynamic profile, means for mounting said blade in said flow passage for rotation about the longitudinal axis passing through said blade along the centre of gravity of said profile with said axis transverse to the direction of flow of said fluid medium, said flow passage being constricted at least upstream of said blade whereby said stream flowing through said passage is effective to cause said blade in rotation to experience successively primarily aerodynamic lift, dynamic and static pressure each tending to rotate said blade, and sufficient in the aggregate to sustain continuous rotation of said blade.

The present invention is particularly useful as a turbine unit for use in a turbine mechanism which includes some means of generating a moving stream of a fluid medium such as a hot gas and also means for discharging the fluid medium after it has been through the turbine unit; and when so employed the turbine unit comprises a turbine casing; means defining a turbine chamber in said casing, a single turbine blade of aerodynamic profile in cross-section, means for mounting said blade in said chamber for rotation about the longitudinal axis passing through said blade along the centre of gravity of said profile throughout the length of said blade with said axis transverse to the direction of flow of said moving stream through said chamber, inlet and outlet passages formed in said casing in communication with said chamber on opposed sides thereof whereby to cause said moving stream to flow through said chamber, said blade and said passages being so dimensioned that said blade in a first position has its outer edges contiguous with the common flow surface respectively of said inlet passage and said outlet passage whereby to form an unimpeded flow passage of constantly and smoothly increasing cross-sectional area in a downstream direction, and in a second position displaced from said first position is effective to substantially prevent the passage of said stream through said chamber.

The present invention will now be described in more detail in conjunction with the accompanying drawings in which:

FIGURE 10 shows in cross-section the basic turbine of the present invention; and FIGURE 11 shows in view (a) and (b) the flow cross-section and the flow pressure and velocity respectively through the turbine unit.

FIGURE 12 illustrates symbolically the three stages of rotation of the turbine blade in a time/distance representation;

FIGURE 13 illustrates symbolically the conditions prevailing when the inlet and outlet axes of the turbine unit are disposed relative to one another at an angle less than 90°;

FIGURE 14 shows the resultant turning moment on the turbine blade for one complete rotation and the constituent forces producing this resultant moment;

FIGURE 20 illustrates one method of cooling the turbine blade;

FIGURE 21 illustrates an alternative method of cooling the blade;

FIGURE 22 illustrates how the forces set up by the cooling may be utilized in controlling the blade rotation;

FIGURE 23 shows a useful high temperature turbine blade construction;

FIGURE 24 shows a two-stage turbine having high and low pressure stages formed according to the present invention.

FIGURE 25 shows in views (a) and (b) a four-stage turbine construction and a two-stage turbine construction respectively;

FIGURE 26 shows how the present invention may be used in miniature turbines;

FIGURE 27 shows how the flow path may be modified for supersonic applications;

FIGURE 28 shows a co-axial turbine of four stages formed according to the present invention;

FIGURE 29 shows the complete system for such co-axial turbine;

FIGURE 30 shows a co-axial parallel flow turbine known as a cross-section turbine;

FIGURE 31 illustrates a manner in which the output of FIGURE 30 may be utilized;

Figure 35:
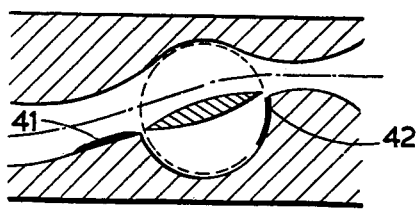
Figure 36:
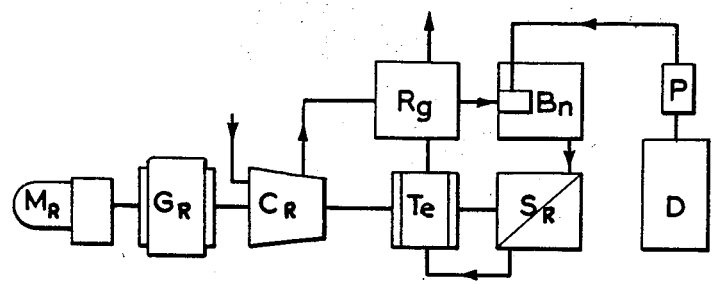
Figure 39:
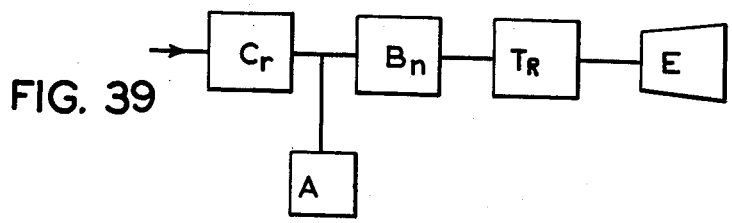
Figure 37:
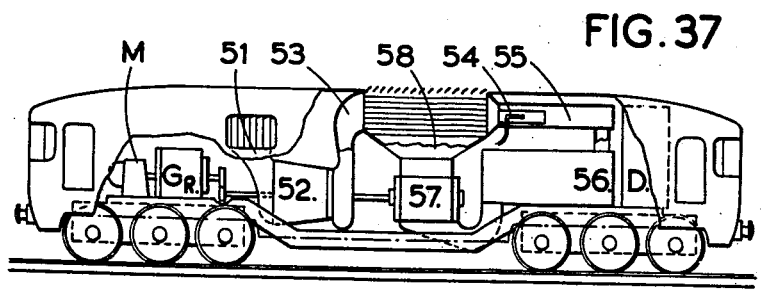
Figure 38:
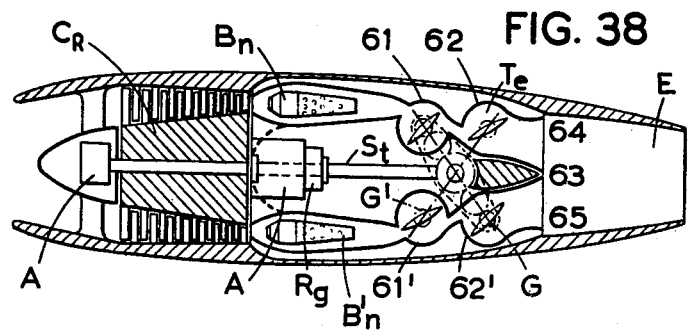
Figure 40:
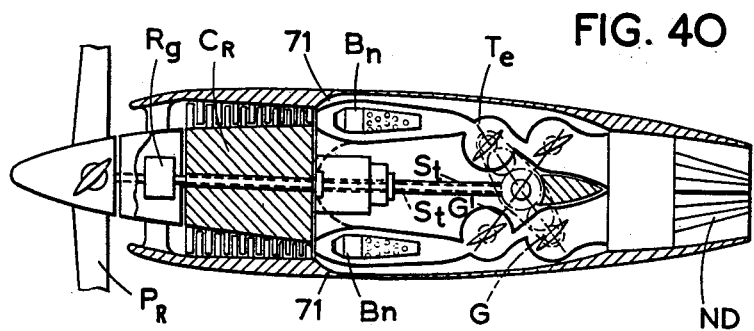

FIGURE 34 gives the block circuit of this turbine construction;

FIGURE 35 shows a simple gas turbine formed according to the present invention when used to burn coal dust;

FIGURE 36 shows the block circuit of such a coal dust burning locomotive;

FIGURE 37 is a pictorial representation of a locomotive having a coal dust burning turbine, driving an electric generator formed according to the present invention;

FIGURE 38 shows in pictorial cross-section the present turbine system when used in a turbo-jet engine; and FIGURE 39 gives the block circuit for such an engine;

FIGURE 40 depicts in pictorial cross-section a turbo-prop engine utilizing the turbine unit formed according to the present invention;

FIGURE 41 gives the block circuit of a turbine system formed according to the present invention which may be used in an automobile;

FIGURE 42 showing the location of such a turbine in the vehicle chassis;

FIGURE 43 showing the turbine in detail in side elevation; and

FIGURE 44 showing the turbine in rear elevation.

The properties of the basic turbine blade of the present invention when operating essentially as an aerofoil under free flight conditions have been expounded at some length in an earlier application No. 731,837, now abandoned, entitled "Rotating Heliciform Structure" filed in the name of the same applicant as the present application on April 29, 1958. In the present invention, where the blade is operating under fixed conditions by virtue of being mounted at either end for rotation in a confined flow stream, its behaviour exhibits the aerodynamic properties of the aerofoil mentioned above only over a certain range of its rotational cycle and this range is shown in FIGURES 1 to 4 of the drawings.

Figure 1:
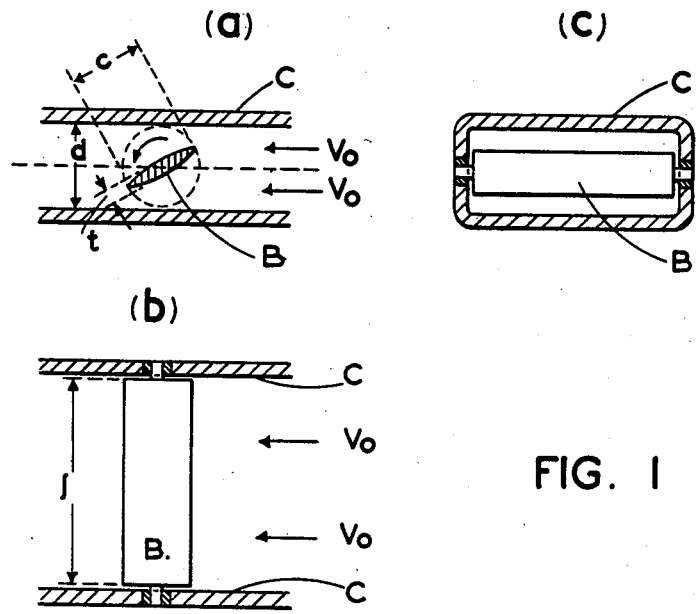
FIGURE 1 shows the basic turbine blade formed according to the present invention positioned, in elevation and plan views FIGURES 1a and 1b respectively, inside a fluid medium with the axis of rotation of the blade transverse to the direction of flow of the fluid medium.

In FIGURE 1 the blade B is positioned within a flow path confined by the flow or inner walls of a casing or conduit C. The blade as shown in FIGURE 1(b) is positioned with its axis of rotation transverse to the direction of flow of the fluid medium and is generally rectangular in plan view and in cross-section is generally elliptical with flattened stream-lined edges. The blade B is so dimensioned and positioned that in an upright position it is effective to substantially close the flow path of the fluid medium flowing with mean velocity $V_0$ past it. This in practice means that the axis of rotation of blade B is positioned midway between the upper and lower flow surfaces of the casing C, i.e. at $d/2$ from either surface, where $d$ is the vertical dimension perpendicular to the axis of rotation and the direction of flow; and $c$ the width or chord length of the blade is made just slightly less than $d$.

The blade may have a variety of shapes in plan view as described in the above-mentioned earlier application but is generally rectangular with a high aspect ratio that is the ratio $l^2/A$ where $l$ is the length of the blade and $A$ is the area in plan view is appreciable. This relationship for a rectangular blade is better expressed as $l/c$ where $c$ is the chord length and $A$ is given by $l \times c$. As mentioned above the chord length $c$ must be substantially equal to $d$ the vertical dimension of the conduit C at the turbine blade B. Also the thickness ratio given by the ratio of the thickness $t$ of the blade to its chord length $c$, i.e. $t/c$ must be low, and the blade may be usefully considered as being formed of two opposed chords of circles of large radii.

Figure 2:
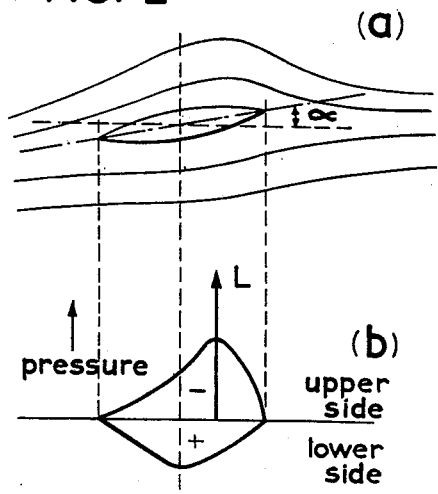
FIGURE 2 shows the dynamic behaviour of the blade when disposed at a given angle to the fluid medium flow.
Figure 3:
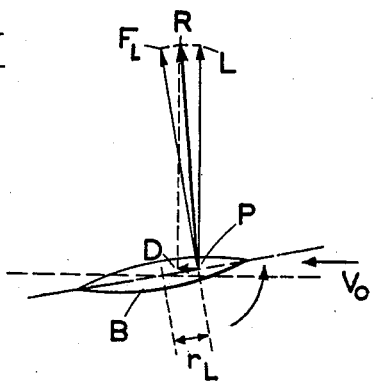
FIGURE 3 shows the forces acting upon the blade when so positioned.
Figure 4:
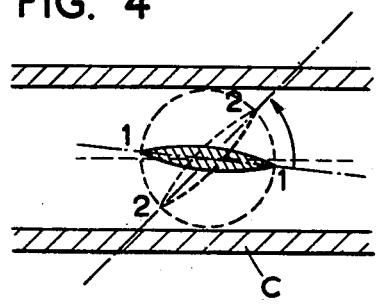
FIGURE 4 shows the range of positions over which the forces may be considered as acting in the manner depicted in FIGURE 2.

The behaviour of this blade when disposed with its chord axis at a slight angle to the flow path as shown in FIGURE 2 where $\alpha$ the angle of attack is illustrated as being about 10 degrees is essentially that of an aerofoil positioned in a fluid medium moving past it with a velocity $V_0$. Here there is a resultant centre of pressure P through which there is an upward or lift force L acting a distance $r_L$ away from the axis of rotation of blade B as shown in FIGURE 3, and in addition there is a drag force D acting on the blade in the direction of flow. On its upper side, the blade has a negative area of pressure which peaks towards the leading edge of the blade, and this suction effect is enhanced by an area of positive pressure or lift on the lower side of the blade, the combined effect on these two pressures being to induce the resultant R, shown in FIGURE 3, upon the blade which tends to rotate the blade and which has a component $F_L$ in a direction normal to the chord axis acting through the centre of pressure P a distance $r_L$ away from the axis of rotation of the blade B giving rise to a turning moment $M = F_L \times r_L$. As explained in more detail in the above application this lift effect is significant over a given range of attack angles of the turbine blade relative to the direction of flow. This is shown in FIGURE 4 where blade B is depicted in two positions 1—1 and 2—2, these being approximately —5 to +35 degrees where zero degrees is designated as the position at which the chord axis is parallel to the flow path so that during this range of rotational values of the turbine blade, it is exhibiting aerodynamic properties and behaves as the aerofoil described in the above application.

Figure 5:
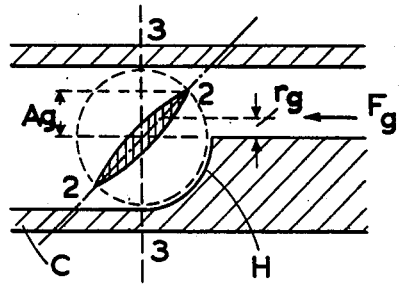
FIGURE 5 depicts the forces which take over when the blade has advanced to a new position and the flow conditions have been modified.

When the position 2—2 is reached, however, the aerodynamic behaviour fades in significance and the forces on the blade become essentially the straight dynamic or kinetic energy forces as shown in FIGURE 5. It will be obvious that to utilize the kinetic energy of the fluid medium to provide a turning moment which will rotate the blade B it is necessary to expose about half of the profile to the flow stream so that the moving stream impinges normally on the blade only on one side of the rotational axis when the blade is upright and this is accomplished by the introduction of the constriction portion H which effectively reduces the upstream flow path to half the chord length $c$. When this is done the force $Fg$ acting upon the blade is given by $Fg = q \times Ap$ where Ap is the effective cross-sectional area of the blade projected on a plane normal to the direction of flow and $q$ is the unit kinetic energy of the fluid medium impinging upon a unit area of cross-section in the direction of flow.

This gives a resultant moment on the blade of $$Mg = F_g \times r_g$$

where $r_g$ is the mean distance of the centre of pressure of the fluid medium above the axis of rotation of the turbine blade B.

Figure 6:
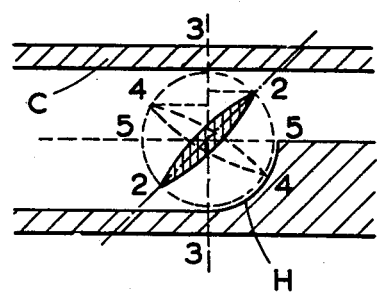
FIGURE 6 shows the range of positions over which this modified flow behaviour takes place.

This force which obviously varies sinusoidally with the rotation of the blade is effective from position 2—2 through a maximum at a position 3—3 where the blade is substantially normal to the flow path through to the position 4—4 at approximately 150° where the direct kinetic energy effect becomes less and less as shown in FIGURE 6.

Figure 7:
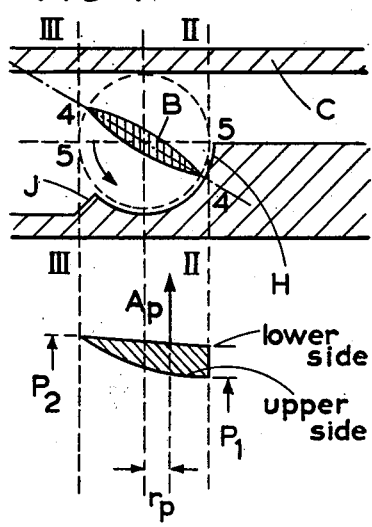
FIGURE 7 shows the next stage in the rotation of the blade when a third set of forces come into play.

When position 4—4 is reached the conditions shown in FIGURE 7 prevail. Here there is a static pressure asserted upon the blade tending to cause its rotation due to the difference in pressure between the pressure on the blade at the inlet edge II—II and that of the down stream edge of the blade III—III. The lower side of the blade B, since it is not directly exposed to the moving fluid medium has a substantially constant upward pressure due to the essentially still fluid medium beneath it, but on the upper side of the blade, however, where the cross-section area of the flow path increases from position II—II to position III—III the static pressure drops from value $P_1$ to value $P_2$ due to the decreased flow velocity. The pressure of the blade at the downstream end is essentially the same for both the upper and lower surfaces, but pressure $P_1$ on the upper side of the blade is progressively lower across the blade than the pressure on the lower side of the blade so that there is a difference in pressure across the chord length of the blade shown as the shaded area in FIGURE 7. There is thus a resulting pressure $A_p$ acting a distance $r_p$ away from the axis of rotation of the blade giving rise to a turning moment $M_p$ equal to $A_p \times r_p$ which rotates the blade from position 4—4 to position 5—5 (FIGURE 7) when the cycle repeats itself. To increase the amplitude of the rotational moment due to the static pressure forces, the cross-sectional area of the flow path towards the downstream edge of the blade B in position 4—4 is reduced by the introduction of a constriction J formed in the casing C, which as is best seen in FIGURE 7 has the effect of making the static pressure on the lower side of blade B move nearly constant across this lower side.

Thus over the range of rotation from 0 to 180 degrees the blade exhibits sequentially three different types of behaviour. The first is what might be essentially considered as an aerodynamic behaviour, the second a purely dynamic or kinetic behaviour and the third a static behaviour all of which create turning moments tending to keep the turbine blade rotating.

Of course none of these forces ceases immediately the other starts; rather there is a merging of the forces with one descending in magnitude while the next is increasing. It is just that over three quite boldly defined ranges of blade revolution from 0 to 180° the pre-eminent force acting upon the blade varies in its basic character. Due to the symmetry of the blade about its major or chord axis these forces repeat during the second half cycle of rotation so that the forces in the second 180° of rotation i.e. from 180 to 360° are the same as those prevailing the first 180°.

As described thus far the invention has been disclosed in its basic form as what is essentially an energy conversion device; whose basic features are:

(a) A confined flow passage formed in a casing or other suitable confining structure, through which flows a fluid medium.

(b) A single symmetrical blade mounted for rotation in a flow passage with its axis of rotation transverse to the direction of flow of the fluid medium.

(c) This blade extends equally on either side of this axis and is positioned midway across the flow passage.

(d) The blade has an aerodynamic profile in cross-section and the diameter of its swept circle is such that in one position at least, namely when the blade is positioned normal to the flow stream, the flow passage is effectively closed; though it should be noted that the device still functions albeit at reduced efficiency even if there is some by-pass of fluid medium round the blade in this position.

(e) To ensure the presence of a rotational moment due to the kinetic energy or dynamic pressure of the fluid medium the flow passage upstream of the blade is constricted so that the flow stream is directed upon the blade to one side only of its rotational axis. This means that in its passage closing position there is a dynamic pressure force exerted on the blade to one side of its rotational axis, causing it to rotate.

(f) A similar construction may be usefully though not necessarily employed on the downstream edge of the blade to assist the rotation due to the static pressure forces when the blade chord axis is approaching the position in which it is parallel to the direction of flow.

Modified blade construction is of considerable assistance in blending these forces into one another so as to give more uniform rotation due to a smoothing out of the rotating moment and also to improve the starting characteristic of the blade. Two such modified blade structures are shown in FIGURES 8 and 9 respectively.

Figure 8:
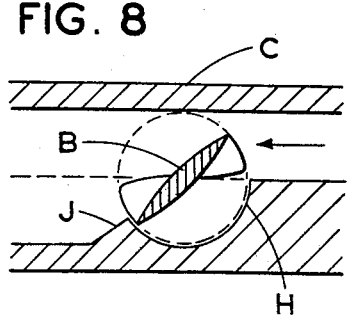
FIGURE 8 shows how the blade may be modified to increase its efficiency.

FIGURE 8 shows a blade B which has been given an heliciform shape by rotating the chord axis about the longitudinal axis of the blade continuously and uni-directionally throughout the length of the blade though the twist need not of necessity be at a constant rate throughout the length. A useful total angle or displacement of the chord axis between the two ends of the blade would be from 5 to 30°. The manner in which this heliciform blade modifies the performance of the turbine blade by smoothing its rotational response is explained in considerable detail in the above application No. 731,837, now abandoned.

Figure 9:
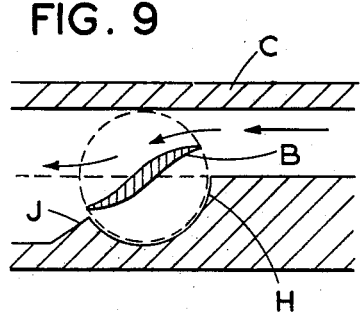
FIGURE 9 shows another modification which may be made to the blade for particular applications.

In FIGURE 9 there is shown an improved turbine blade of a modified S-shape profile which has been also described in the above-mentioned earlier application; this blade having the advantage that it enhances the initial rotational moment when the blade is behaving as an aerofoil under aerodynamic conditions without significantly modifying its behaviour in the other two phases of its rotational cycle.

FIGURE 10 shows the basic turbine unit structure of the present invention. From a study of FIGURE 10 it will be appreciated that the basic turbine structure consists essentially of three portions 11, 12, and 13 lying between the sectional lines I—I, II—II, III—III and IV—IV.

Between section I—I and II—II, the turbine casing C has an inlet portion 11 in which is formed a convergent inlet passage 10 of gradually reducing vertical dimension so that the cross-sectional area of the inlet passage is gradually being reduced. Between sections II—II and III—III the casing C has a central portion 12 in which is formed a turbine chamber 14 of generally circular cross-section communicating with the inlet passage 10 at its upper edge so that the upper flow surface of the inlet passage 10 merges smoothly and generally tangentially with the upper flow surface of the turbine chamber 14. Between sections III—III and IV—IV the casing C has an outlet portion 13 in which is formed an outlet or discharge passage 15 which is of gradually increasing or divergent cross-section and whose upper flow surface merges with the flow surfaces of the turbine chamber 14 in a smooth and generally tangential manner similar to that of the inlet passage 10. It should be noted that the mean flow axis of the inlet passage 10 is disposed at an angle to the mean flow axis of the outlet passage 15 as it leaves the turbine chamber 14 which will be dealt with at greater length below.

Alternatively, the turbine chamber and its associated inlet and outlet passageways can be considered as a flow passage formed within the casing C extending through this casing with the upper flow surface of the bore being generally smooth and continuous throughout the casing with a minor arc of a circle being formed in the central portion. The lower flow surface, however, is smoothly convergent with the upper flow surface in the inlet portion of the turbine casing and is smoothly divergent with the upper flow surface in the outlet portion of the casing and intermediate these two portions the lower flow surface in the central portion of the casing has formed therein a recess or chamber whose surface follows an arc of the same circle as the upper surface. Positioned in the turbine chamber 14, there is a turbine blade B mounted for rotation in the chamber with its axis of rotation transverse to the direction of flow and generally co-incident with the longitudinal axis of the cylindrical turbine chamber. This blade has a symmetrical aerodynamic profile in cross-section chosen for the particular application and in a preferred form may be regarded as two identical shallow arcs brought in face to face engagement with one another, though the profile may be modified in the manner described above particularly to the form described below in connection with FIG. 27. This blade B extends the length of the turbine chamber 14.

The chord length of the blade is such that it is just slightly less than the diameter of the turbine chamber 14. This means that if the blade is rotated, it closes the chamber, i.e. it effectively prevents any substantial passage of fluid medium through the chamber, over a range of angular rotation shown here as angle $\beta$ lying between positions 6—6 and 7—7. The range of $\beta$ is dependent upon the dimensioning and positioning of the inlet and outlet passages, upon the angle at which the mean axis of the outlet passage 15 is disposed to the mean axis of the inlet passage 10, and also upon the shaping of the upper flow surfaces of the inlet and outlet passages as they merge with that of the turbine chamber. If these surfaces are made ideally tangential with the turbine chamber flow surface in the manner described above, though this is not necessarily the case, then the closure angle $\beta$ is equal to the angle subtended between the main axes of the inlet and outlet passages.

If the upper flow surface is made linear, i.e. there is no curvature in this surface and the inlet and outlet main axes are made co-linear, then $\beta$ will become zero and the turbine chamber will be fully closed at only one unique position of the turbine blade B. As explained above in connection with the energy conversion device of FIGURES 1 to 9, such a unique closure condition is acceptable and the turbine unit will operate under such a condition. However normal commercial conditions will generally dictate that the closure extends over an appreciable range of angular rotation so as to obtain the benefit of the improved operating efficiency achieved by such a measure.

In FIGURE 11 are shown the area of cross-section and velocity and pressure curves through portions 11, 12 and 13 along the section lines I—I, II—II, III—III, IV—IV. In FIGURE 11a in portion 11, it will be seen that the area of cross-section of the flow passage reduces smoothly in the inlet passage 10 due to the convergent flow surfaces in this portion. This decreasing flow cross-section is matched by an increased velocity and a decreased static pressure. In the central portion 12 the cross-sectional area of the flow passage increases smoothly and generally uniformly along the length of the flow path. However, it will be noted that in portion 2 the pressure remains generally constant though the velocity is decreasing quite rapidly. This is due to the expansion of the fluid medium in a generally adiabatic fashion so that while the cross-section is increasing and the velocity is decreasing, the pressure remains substantially constant. In outlet portion 13 the pressure reduction is resumed and under ideal conditions the discharge from the turbine outlet passage 15 for a single stage turbine would be at mospheric pressure, $P_{atmos}$. As the outlet passage 11 has divergent flow surfaces and hence a constantly and smoothly increasing area of cross-section the velocity also decreases in portion 13 as shown in FIGURE 11b.

The closure of the flow path by the rotating blade is shown symbolically in FIGURE 12. Here over a first period of time, $t_1$, the blade B is closing the flow path in the manner indicated by the dotted line in this portion. Next over a subsequent period of time, $t_2$, the flow path is substantially fully closed by the turbine blade, and finally over a period of time $t_3$, the flow path opens and slowly increases in cross-section in the manner shown by the dotted line until it has reached its full discharge value.

From the foregoing it will be appreciated that as a general condition, the flow passage should not be closed when the blade is rotating through the range of angles where it exhibits an aerodynamic behaviour, i.e. the fluid medium must be able to flow from the inlet passage over both the upper and lower surfaces of the blade through to the outlet passage; and furthermore when the blade is in its chamber closing range of angular rotation there should be no direct communication between the inlet and outlet passages, and the flow stream should impinge directly on the blade on only one side of its axis of rotation.

In practice, the requirement that the chamber be closed over a range of angular rotation of the blade means that this range has a finite value e.g. 20 or 30 degrees but with certain configurations this range can reach a limiting condition where the chamber is closed for one unique position. Also closure need not be absolute since this would present really formidable problems in machining and alignment, the requirement may be best expressed by saying that the chamber is substantially closed by the blade.

One example of an inefficient configuration is shown in FIGURE 13; here the closure range is over a range of approximately 80 degrees from position 8—8 to 9—9 of blade B. This closure angle $\beta$ is here governed by and approximately equal to the angle between the mean axes of the inlet and outlet passage due to the fact that the upper flow surfaces of the inlet and outlet passages are substantially tangential to the upper flow surface of the turbine chamber. It will be seen that with this configuration it is possible for the blade to rotate to a position where the aerodynamic effect is no longer significant, and yet the kinetic effect has not taken over due to the fact that the flow stream can pass on either side of the blade B. Hence the blade either will not rotate or will do so jerkily and inefficiently. For this particular embodiment therefore, the angle between the axes of the flow passages is arranged to be not less than 90 degrees. A graphical representation of the various rotational moments produced by the three different effects listed above, namely aerodynamic, kinetic and static pressure forces are shown in FIGURE 14. Here the zero reference position is taken as that position where the turbine blade has its trailing and leading edges flush with the lower surface of the inlet and outlet passages respectively. At this point the kinetic energy curve $M_g$ is substantially at zero, the lift drive due to the aerodynamic forces $M_1$ has a slight value and the static pressure curve $M_p$ is at a maximum. Thereafter as the blade rotates between 0 and 90° the kinetic energy curve rises to a maximum which it reaches at about 90 degrees; the aerodynamic or lift force reaches a peak at approximately 30 degrees and thereafter falls to zero at 90 degrees and the static pressure force falls to zero at approximately 45 degrees.

Between 90 and 180 degrees the kinetic force $M_g$ falls down to substantially zero, the lift force $M_1$ remains at zero until just slightly before the 180 degrees position, i.e. approximately 175 degrees, when the lift force again comes into effect and the static pressure force remains at zero until approximately 145 degrees where it again starts to rise. Due to the symmetry of the system the rotation of the blade to 180 degrees causes a return to the original zero degree conditions so that between 180 and 360 degrees the various moments repeat their behaviour between 0 to 180 degrees.

The resultant moment $M_R$ never reaches zero since one or the other of the forces is always in play but it does have peaks at approximately 75 and 255 degrees and between these points is generally sinusoidal in form in the manner shown for $M_R$ in FIGURE 14.

The resultant moment $M_R$ can be smoothed somewhat by employing a two stage or compound turbine as shown in FIGURE 15(a) where a first stage having first stage portions 11, 12 and 13 formed between section lines I—I, II—II, III—III and IV—IV, in the manner shown in FIGURE 10 has been coupled in advance of a second stage having portion 11a, 12a and 13a formed between section lines III—III, IV—IV, V—V and VI—VI. Portions 13 and 11a is common to both stages and is the discharge passage for the first stage and the inlet passage to the second stage.

With the blades as shown in FIGURE 15(a), there is no phase shift between the blades, that is when the first blade is in its zero degree reference position, as defined above, the second blade is also in this position; though it should be noted that the blades due to the necessary configuration of this system, are rotating in opposite directions. From a study of FIGURE 15(a) it will be obvious that the cross-sectional area of the flow path varies in the manner shown in FIGURE 15(b). In portion 11, the cross-sectional area of the flow path decreases smoothly in the direction of the first stage chamber; in portion 12 past the turbine, it is substantially constant; and in portion 13 compromise is reached between the two conflicting requirements, namely that as the outlet passage for the first stage the cross-sectional area should increase and that as the inlet passage for the second stage its cross-sectional area should decrease and so the passage in common portions 13 and 11a is maintained at substantially constant cross-section. In portion 12 the flow path is of increasing cross-section and in portion 13a where the hot gases are discharged from the second stage to the atmosphere there is a very appreciable increase in the cross-sectional area.

The related pressure and velocity curves are shown in FIGURE 15(c). The pressure in portion 11 is decreasing due to the increase in the velocity of the gas in this portion. In portion 12, the pressure remains substantially constant while the velocity falls due to the increasing cross-sectional area; in portion 13 the pressure falls while the cross-section remains substantially constant and so the velocity rises. Across portion 12a of the second stage turbine chamber the pressure is again held substantially constant whilst the velocity falls due to the increasing cross-sectional area and finally in portion 13a where the cross-section increases appreciably both the pressure and velocity falls with the final discharge pressure being substantially atmospheric $P_{atmos}$ and under ideal conditions the final discharge velocity is substantially zero.

Figures 15, 16:
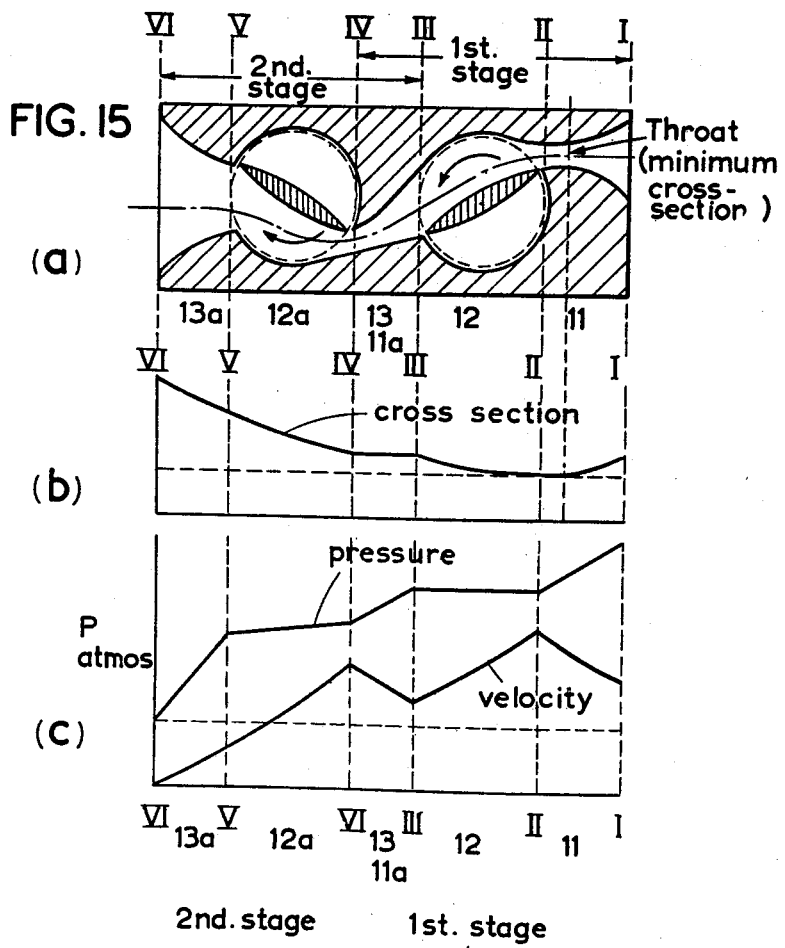
FIGURE 15 shows in view (a) a two-stage turbine formed according to the present invention with view 15(b) showing the relative cross-sections of the flow path and 15(c) showing the pressure and velocity curves in these cross-sections.
FIGURE 16 illustrates the phase displacement which may be present between turbine blades disposed adjacent turbine chambers.

Consider now the result when the two blades are caused to have a phase shift relative to one another as shown in FIGURE 16. Here six positions of each blade are indicated by the position lines 0, 1', 2', 3', 4', 5' and 6' for each blade with position 6' being the 180 degree position for each blade, so that after this position the cycle repeats itself. Each position is therefore about 30 degrees further advanced from the preceding one. The 0 position occurs when both blades are in line with one another and generally parallel to the incoming flow stream. Position 1' occurs when each of the blades is positioned so that none of the blade projects into the flow stream and the flow is therefore unimpeded.

When the blade of the first stage is in position 1', i.e. the flow path through the first stage is unimpeded, the second blade is in its 0 position, i.e. is 30 degrees behind the position of the blade of the first stage, so that the position of the second stage lags the first by 30 degrees.

Assuming that the turbine chamber configuration is such that each chamber is only fully closed when its blade is in the range of angular rotation between positions 3' and 4' respectively, i.e. in the hatched areas shown between these two positions in FIGURE 16, then it will be obvious that when the blade for the first stage is in this range, it is effectively preventing any of the gases from reaching the second stage so that the output on the second stage will be low and will mostly be that due to the inertia of the system. Similarly, even in position 5' the output from the second stage will be low due to the very small amount of gas permitted to flow past the turbine blade of the first stage.

Figure 17:
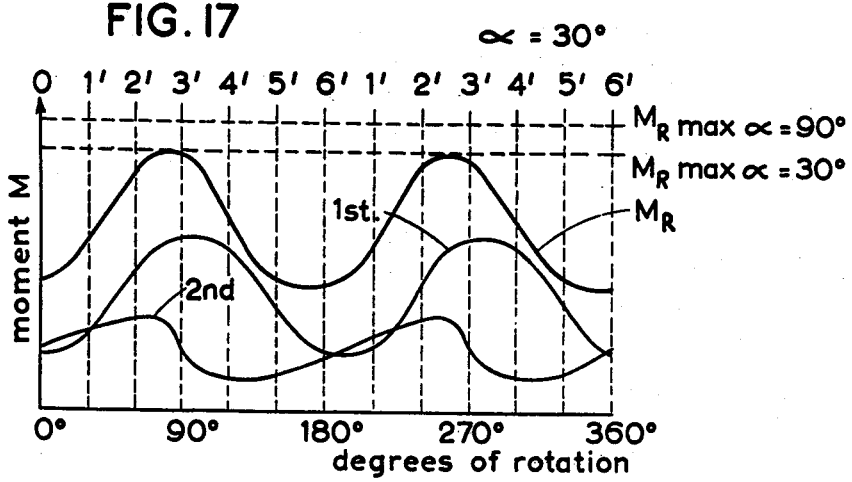
FIGURE 17 shows the resultant and constituent moment for a phase shift of 30°.

The resultant moments for a thirty degree phase shift are shown in FIGURE 17. Since it is assumed that the first turbine stage is relatively unaffected by the position of the blade in the second stage, the output from the first stage will follow the resultant moment curve given in FIGURE 14. The output from the second stage however, is, it will be noted, very much modified with low points being reached during positions 3' and 4' and no particular peaks being reached intermediate these two low points. The overall effect so far as the resultant moment $M_R$ is concerned is that there is an increased output over the single stage, due to the presence of a two stage turbine, and this increased output is somewhat smoother than the output from the single stage due to the levelling effect of the torque produced by the second stage.

Figure 18:
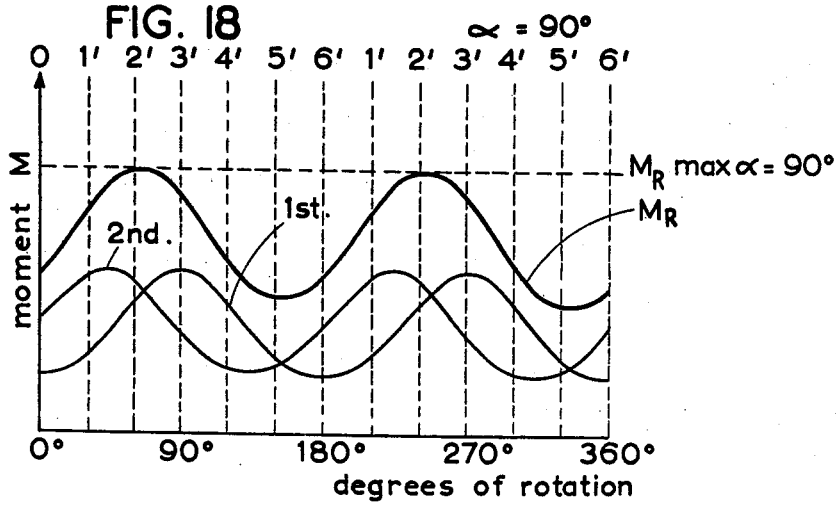
FIGURE 18 shows the resultant and constituent moment for a phase shift of 90°.

The resultant moments when the phase shift angle is 90 degrees are shown in FIGURE 18. Here the output from the first stage is the same as in FIGURE 17, but the output from stage 2 is now much improved and essentially follows a classical sinusoidal pattern though its oscillations are of smaller amplitude and lower peak value than those for the first stage. The resultant moment for the ninety degree phase shift is thus one of greater peak value and also of greater amplitude of oscillation than was the case for FIGURE 17.

In general the phase shift angle can be varied to vary the torque output from the shaft coupled to either of the turbine blades as would be the case where the turbine is used to drive a ship or automobile or to reduce the shaft output and permit the gases to be discharged from the turbine unit at higher velocity, the latter being a desired condition for example in a jet engine where some mechanical energy is needed to drive the compressor, but the actual propulsive force is produced by the exhaust jet. Thus by providing a suitable means such as a gear and clutch arrangement (not shown) it is possible to regulate the output from turbine unit either to extract maximum mechanical energy from either or both of the shafts, or to extract only sufficient mechanical energy to do the useful work and to allow the gases to be discharged at a high level of kinetic energy.

As mentioned above, one of the big problems of conventional turbine systems is that at the upper limit of power extraction, the temperatures reached are so high that further progress cannot be made without either improved cooling or superior alloys able to withstand higher temperatures. Due to its peculiar configuration the turbine unit of the present invention readily lends itself to a variety of cooling systems both for the turbine casing and for the turbine blade itself.

Figure 19:
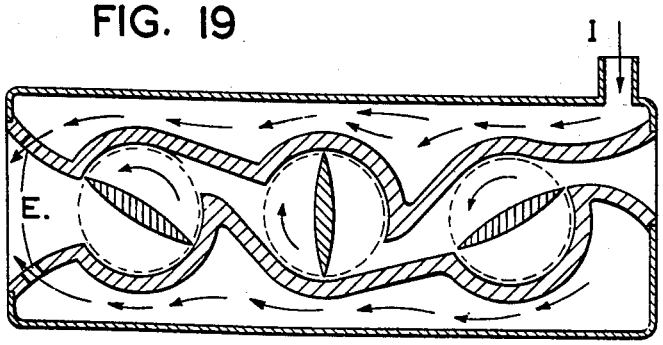
FIGURE 19 shows one method of cooling the turbine casing.

One method of cooling the turbine casing is shown in FIGURE 19 where the casing surrounding each of the turbine chambers has been made hollow. A suitable inlet port 1 permits a coolant to enter and flow across the outer walls of the turbine chambers thereby cooling them uniformly, since, due to the absence of any projections from these chamber walls into the combustion gases (such as the stator blades of the conventional turbine), the temperature distribution across these turbine walls can be readily controlled. The coolant may then usefully be discharged through ports E into the discharge gases which has the additional benefit of lowering the outlet temperature.

An alternative configuration is shown in FIGURE 20 where the chamber walls have been fitted with cooling fins projecting into the coolant flow thereby increasing the rate by which heat is removed from the turbine chamber walls and of course the number and position of these fins can be varied to accommodate any given temperature gradient.

In addition the system of FIGURE 20 shows a method of cooling the turbine blade itself. Here the cooling medium enters into the blade through one of the two hollow supporting shafts, flows across the length of the blade and is discharged from the hollow shaft on the far side. Support for the blade B is given by a central web W. If water is used as the coolant, then due to the temperatures involved, steam will be generated inside the turbine blade and this steam upon being discharged from the far side may be usefully employed in the larger type of power installations to drive another turbine generator or any other piece of auxiliary equipment operating on steam. The steam after suitable condensation may be recycled for re-use thereby providing a closed circulation cooling system.

Another arrangement for cooling the blade itself and also the flow surface of the turbine chamber surrounding the shaft mountings is shown in FIGURE 21. Here the same hollow shafts used in FIGURE 20 are employed except that the coolant preferably a gas such as air now enters the blade from both sides and passes through a hollow shaft formed inside the blade at either end, each of these shafts terminating short of the centre of the blade which is divided into two compartments by a central web W. The cooling gas then becomes heated and due to the centrifugal forces acting towards the outside edges of the blade, and the higher temperature of the blade, the heated gas is pushed outwardly from the centre to the edge of the blade and is exhausted from the blade through the orifices $O_r$ onto the flow surfaces $F_s$ of the chamber surrounding the blade journals. These journals are mounted in a suitable recess in the turbine chamber wall and are cooled by these cooling gases which also protect the downstream walls of the chamber since on discharge they flow downstream along the chamber close to these walls.

If water is used as the coolant of the system of FIGURE 21, then steam will be generated. This steam, provided its discharge velocity $V_t$ from the blade is greater than the tip velocity $U_t$ of the turbine blade due to its rotation will, if discharged substantially tangentially to the blade through jets $J_t$ at the tips of the outer edges of the blade B, augment the rotation of the blade by forming small reaction turbines at the outside edges of the turbine blade.

The smooth profile of the turbine blade can be protected very effectively by a layer of ceramic overlying the metal core of the blade in the manner shown in FIGURE 23. Due to its brittle nature it is desirable to have the ceramic applied in sections from between pins which are attached to the core of the blade, and also since it is very difficult to form ceramic into a suitable profile for the outer tips of the blade, these are preferably made of metal integrated with the core of the blade. The blade formed in this manner has a high corrosion and oxidation resistance compared with even the best metallic alloys and so would allow a considerably higher turbine operating temperature to be used and hence allow the turbine system to have a higher efficiency.

Present turbine inlet temperatures are in the range of 650° C. to 750° C. and at this temperature the overall efficiency of even the best systems at present in use, employing intercooling and reheat, can only reach about 25% efficiency which is still appreciably below the common diesel engine efficiency of 35%. By increasing the inlet temperature to 1000° C., an overall gain in efficiency of approximately 10% can be achieved and since such a temperature can be used in the present invention, the thermal efficiency of a turbine unit formed according to the present invention could be made to equal that of the diesel engine. Moreover this efficiency would be obtained with a system of lower cost, greater reliability, and lower fuel consumption than any other system, such as the diesel engine, having this order of efficiency.

Turning now to the various applications to which the basic turbine unit disclosed above can be put. The most simple application is that mentioned above in connection with FIGS. 15 and 16, namely a two stage turbine. Here of course in the usual manner of compounding turbine stages the first stage will be a high pressure turbine and the second a low pressure turbine in the manner shown in FIGURE 24.

The first stage will be dealing with a lower volume of gas at higher pressure than the second stage and hence will be smaller than the second stage, and also with the configuration shown in FIG. 24, the two turbine blades will be rotating in opposite directions. As mentioned above, control of the phase shift angle between the two blades provides a ready means of regulating the amount of power in the form of mechanical energy extracted from the system.

In certain applications it is desirable to have the turbine layout flat and this of course is impossible with conventional turbine designs. Two simple flat layouts are shown in FIGURES 25a and 25b respectively. In FIGURE 25a, a four stage turbine is shown where each of the chambers is disposed in series in essentially a straight line with alternate blades rotating in opposite directions when viewed from one end. FIGURE 25b shows a two stage turbine in which the main flow path of the hot gases follows a generally circular path and does not have the sinusoidal curve characteristic of the embodiment shown in FIGURE 25a, though to accommodate this configuration it is necessary to have the inlet and outlet passages disposed at an angle to one another, so that two stages is practically the limiting number for this particular flat layout, where it should be noted the blades are rotating in the same direction.

However the system of FIGURE 25b can be extended in a generally circular form in the manner shown in FIGURE 28 where a four stage compressor is shown in a coaxial layout. The flow path of the gases is substantially circular around an annular flow path with the four stages being disposed generally symmetrically and co-axially about a common centre; all the turbine blades rotate in the same direction and may be suitably geared to drive a common shaft.

One important benefit of the present turbine over conventional systems is that it readily lends itself to miniaturization. Very small turbines along the lines shown in FIGURE 26 may be built where the blade may be very small and of low inertia so that high rotational speeds are possible which means that even a very small turbine can deliver a useful amount of work. Such a turbine would be of appreciable benefit in the instrumentation field, particularly for missiles where a high power/weight ratio is of primary importance.

Since only two critical cross-sections are present in the system, namely at the points of maximum constriction of the inlet and of the outlet passages respectively, the turbine of the present invention can be employed with gases moving at supersonic speeds as shown in FIG. 27. The inlet passage is designed so that the shock wave is fixed in an optimum position and the single turbine blade can be designed to have the optimum form for use in conjunction with gases moving at supersonic speeds.

A complete system employing the co-axial turbine of FIG. 28 is shown in FIGURE 29. Here air enters the compressor C and is then passed to the burner $Bn$ after which the hot gases impinge upon the coaxial turbine $Te$ and then are exhausted to the atmosphere. The turbine drives both the compressor $Cr$ and the generator $Gr$. Starting is provided by a small electric motor M which cuts out as soon as the turbine has picked up sufficient speed. A turbine of this type would be very useful as a stand-by generator, operating on natural gas or crude oil, for peak hour service in, for example, large cities where it is frequently necessary to provide expensive equipment to supply power for peak service conditions even though such equipment is only required for a few hours at most per day. The turbine of the present invention would provide a stand-by generator of extremely low cost, quick starting and high reliability.

An alternative configuration for the turbine is shown in FIGURE 30 where the layout is generally the same as for the co-axial turbine of FIGURE 28 except that the main gas flow is now divided into two parts through the turbine and at the entrance to the turbine $Te$ and each part flows over a semi-circular path, is discharged in common with the other parts at the foot of the turbine. Thus hot gases entering from the burner $Bn$ impinge upon the vane V and are divided equally between the two groups of turbine stages, $Te_1$, $Te_2$, $Te_3$ and $Te_1'$, $Te_2'$ and $Te_3'$, respectively. In the configuration depicted here alternate turbines on either side will rotate in opposite directions, thus turbine stages $Te_1$, $Te_2'$, and $Te_3$ will rotate in the one direction, while stages $Te_1'$, $Te_2$ and $Te_3'$ will rotate in the opposite direction. Each of these groups may be coupled by simple well-known gear assembly to a central drive shaft, the two groups of turbines being coupled to the shaft one at either side of the turbine so as to produce rotation of the shaft in the same direction.

A modification of this arrangement is shown in FIGURE 31. Here the two groups are coupled at either end to separate or split drive shafts S1 and S2 which then rotate in opposite directions. By making the intake vane V variable in position the amount of power delivered to either group can readily be varied with emphasis being placed on one group or the other as desired. The compressor of the turbine system usually takes by far the greater part of the energy so that the power flow from the turbine could be arranged to provide the greater part of the output towards the compressor from say shaft S1 with the generator being driven from shaft S2. By suitable control systems regulating the position of the vane and the relative phase shift angles of the different turbine blades it would be possible to devise a system which automatically accommodates itself to varying demand levels.

Figure 32:
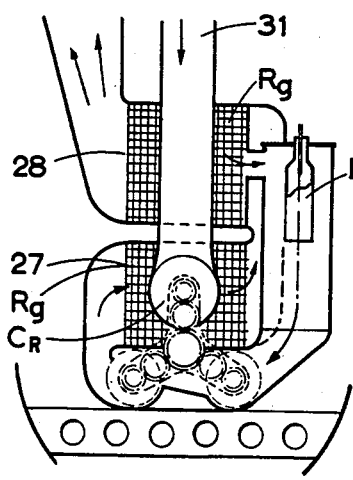
FIGURE 32 shows in a side elevation a gas turbine formed according to the present invention which utilizes a regenerator.
Figure 33:
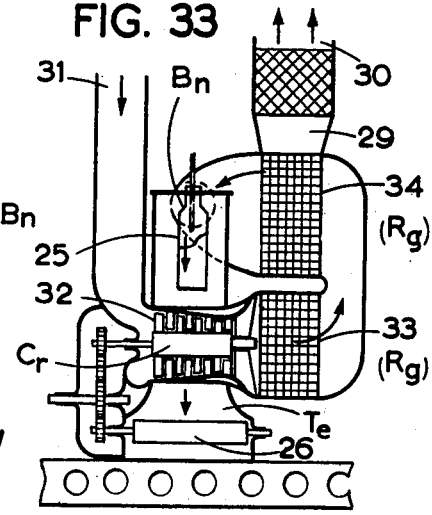
FIGURE 33 shows the turbine of FIGURE 32 in end elevation.

Several of the well known expedients used to improve the efficiency of conventional gas turbine systems can also be readily employed with the turbine disclosed as the fundamental feature of the present invention. For example, regeneration which is the heat exchange system fixed to a turbine by which the incoming air being fed to the compressor is heated by the outgoing exhaust gases, is very easily used, and such a system is shown in FIGURES 32 and 33. The incoming air 31 enters the compressor $Cr$ which is driven by the turbine $Te$, passes through the compressor and after compression reaches the burner $Bn$ from which the hot gases flow into and drive the turbine $Te$. Between the compressor $Cr$ and the burner $Bn$, the incoming air passes via chambers 33 and 34 through the regenerator $Rg$ having sections 27 and 28 where the air is warmed by the outgoing exhaust gases from the turbine $Te$ which pass through these two regenerator sections and thence to the exhaust 29. A labyrinth type sound reducer ND is generally provided to diminish the exhaust noise after which the gases exhaust to the atmosphere 30. Thus the exhaust gases transfer at least a portion of their heat to the incoming air which is fed to the burner considerably improving the efficiency of the system.

The overall circuit for this type of unit is shown in FIGURE 34. Here the incoming air passes from compressor $Cr$ through the two regenerator stages $Rg$ to the burner $Bn$ and thence to the turbine $Te$. From here the exhaust gases are fed through the regenerator $Rg$ to the exhaust containing the noise reducer ND. Needless to say there is not in the regenerator $Rg$ any actual mixing of the exhaust gases with the incoming air, the hot gases transferring their heat to suitable vanes of a radiator type structure to which the compressor air flows. A turbine of this type is considered to be particularly useful for marine installations over the whole spectrum of vessels from freighters to fast liners; this being due in particular to the reduced weight, small volume, the low level of vibration and flexible control, of the turbine unit.

One problem which has long awaited a successful solution is that of devising a turbine which can utilize coal dust or pulverized coal as a source of fuel for providing the necessary hot gases to drive the turbine. Some work has been done in this field but always the very nature of the fuel has imposed limitations on the equipment both from the point of view of maintenance and from useful power output.

The chief drawback has been that in conventional systems deposits form at the roots of turbine blades. With the symmetrical profile of the turbine blade employed in the present invention, the formation of deposits is reduced to a minimum so far as the turbine blade is concerned. It is possible that deposits will form in two places on the turbine flow passage and chamber of the present invention as shown in FIGURE 35. Here deposits can build up on the lower side of the intake passage and on the chamber walls 41, but these deposits can only build up to a very limited extent due to the self-cleaning action of the rotating turbine blade. Deposits can also build up in the lower surface of the outlet passage 42. However the build up will be very slow and the reduction in efficiency negligible except over a very long period of time and in practice, the normal maintenance schedules would take care of any such deposits.

The general layout of a coal dust turbine is shown in FIGURE 36; here coal dust from a reservoir D is fed by a pump or blower P to the burner B$n$. Here the fuel is burned with air coming from the compressor C$r$ through the regenerator R$g$. The mixture of hot gases and coal ash particles passes to the separator S$r$ which has an ash separating system usually consisting of a row of single cyclone separators which must of course be of appreciable size to filter out the considerable amount of ash present. From the separator the filtered hot gases are passed to the turbine T$e$ where they are employed to do useful work in driving the compressor C$r$ and generator G$r$, after this the hot gases pass through the regenerator R$g$ where they are used to heat the incoming air from the compressor C$r$. Starting is provided by means of a suitable electric motor M$r$.

The practical layout is shown in FIGURE 37. Air is taken through the side inlets 51 on either side of the locomotive to reduce to a minimum the danger of contamination with exhaust gases. This air then passes through a compressor 52 and thence into the burner 54. Here it is burned with coal dust in the combustion chamber 55 after which the hot gases pass through the separator 56 to the turbine 57. They are then exhausted through the regenerator 58 to the atmosphere in the roof of the locomotive. The fuel is stored in the reservoir D.

The traction D.C. generator G supplies the power for driving the locomotive, the actual drive being provided by means of electric motors coupled to the various wheels as desired, and starting is provided by the customary electric starting motor M.

This system has the advantage that the robust nature of the blade and the higher temperatures which are possible with this type of turbine due to the improved cooling, coupled with the peculiar construction possible for the blade which gives a higher resistance against erosion and corrosion, mean that the efficiency of the system is high, and furthermore maintenance is simple since all the parts subject to build up of deposits are readily accessible for maintenance.

It is anticipated that the turbine unit of the present invention will also find particular employment with that type of gas turbine commonly known as the jet engine. Though used elsewhere this engine is primarily used in the aircraft field where it has two main types of use, either as a pure jet developing thrust by virtue of the exhaust gases or as a turboprop where the thrust is developed by a propeller, geared to the turbine unit. Since a compound turbine formed according to the present invention can, in the manner described above, be readily adapted either to generate more thrust in the exhaust gases, or to direct more of the kinetic energy into useful mechanical energy of the rotating shaft, the present turbine unit may be usefully employed in both these types of jet engine.

The main objectives of both types of engine are however parallel, namely a very high power-to-weight ratio, and the reduction of weight wherever possible. This means that the system must be operated at its highest efficiency or in other words very near the limits, both structural and thermal of its materials. Here the present turbine with its higher inlet temperatures, reduced weight, and smaller layout is particularly useful.

The general circuit in block form for a jet engine is shown in FIGURE 38. Air enters into the compressor C$r$ and passes to the burner B$n$ where the hot gases are produced which are fed to the turbine T$e$, after which they are exhausted through the diffuser E. Auxiliary power is needed for the various types of auxiliary equipment such as pumps, etc. designated generally by block A.

A pure jet engine is shown in FIGURE 39, the inlet air passes to compressor C$r$ which delivers it to the two burning chambers B$n$ and B$n'$ and thence to the turbine unit T$e$ which consists of a double sided unit, one side being formed by turbine stages 61 and 62, and the other by stages 61' and 62'. Due to the opposing rotation of the turbine blades in each side of the system, turbine stages 61 and 62' are geared through reduction gearing G to the main shaft $S_t$ and stages 61' and 62 are geared through reduction gearing G' to the shaft $S_t$. Auxiliary mechanical and electrical power is taken from shaft S by the units A either before or after the compressor C$r$. Thereafter the exhaust gases are passed through to the diffuser or exhaust E at the points 63, 64 and 65.

Cooling for the system is provided by air which is bled from the compressor C$r$ and passed behind the combustion chambers B$n$ and B$n'$ to the walls of the turbine stages. Any necessary reduction in speed between the drive shaft $S_t$ and the rotation speed required for the compressor C$r$ is accomplished by the reduction gearing RG.

Depending upon the particular requirements of the engine and its varying needs for thrust in various conditions of flight, such as take-off, cruising and landing, the phase shift angle of the turbine blades can be varied either to pass a greater volume of gases to the jet or more power can be delivered to the compressor C$r$.

A turbo-prop system is shown in FIGURE 40 which is similar to the layout described in connection wtih FIGURE 39 except that instead of being connected to the common drive shaft $S_t$ one side of the turbine is now connected through reduction gearing G to the drive shaft $S_t$ which drives the compressor as before, and the other side is connected through the reduction gearing G' to a second drive shaft $S_t'$, co-axial with the main drive shaft $S_t$, which passes through the compressor to the reduction gearing RG which drives the turbine propeller. For this type of turbine of course the energy of the exhaust gases is considerably reduced since little or no thrust is needed and most of the useful work is done in driving the propeller and the compressor. The benefits of the turbo-prop so far as fuel economy and long range cruising are concerned, are well known and do not require repetition here.

The motoring public has long awaited a turbine-driven car but so far none has appeared in full scale production. This due to the erosion troubles which occur with the turbine blades; the slow acceleration response and the high noise level, together with the difficulty of disposing of the large volume of frequently noxious exhaust gases. Also a major problem is the need for producing a turbine which can be used in stop-and-start driving conditions as well as cruising on the open highway. The present turbine design could produce a turbine which would function reasonably efficiently provided the car was driven always at one speed but at low varying speeds such as are encountered in driving through city traffic fuel consumption would become intolerable and the fuel reservoir of inordinate size. One way around the problem might lie in the production of superior alloys; however this would tend to price the automobile out of the normal commercial market, and another way of overcoming the problem namely through the use of low grade fuel would, it is felt, rapidly produce turbine failure and so this approach would not be acceptable either.

The turbine of the present invention is considered to be readily adaptable through use as an automobile and the circuit is shown in block form in FIGURE 41. Air enters through the filter Fr and passes to compressor Cr. Here it is compressed and then fed through the regenerator Rg to the burner Bn, from which the hot gases pass to the turbine. The generator Gr provides the necessary electrical power for use in the vehicle. The exhaust gases are fed from the turbine through the regenerator Rg and out to the atmosphere through the noise damper or muffler ND.

The practical system is shown in FIGURES 42, 43 and 44. Due to its low weight and compact construction the turbine can readily be housed at the rear of the vehicle in the manner shown in FIGURE 42 where the engine may be readily stowed in trunk 82 of the normal size automobile 81.

The vehicle is shown in side and rear elevation in FIGURES 43 and 44 respectively. Air enters through a suitable grill in the rear cover of the car 81 and passes through the filter Fr to the compressor Cr which is positioned transversely to the front-to-rear line of the vehicle. The air then returns, again in a cross-wise fashion, through the regenerator Rg to the duct Dt which guides it down to the burner stage Bn which is positioned at the bottom of the unit below the filter Fr. From there the hot gas is passed to the turbine Te positioned at the bottom of the vehicle and the useful work is extracted from the turbine by means of suitable gearing from the gear box GB. After the turbine Te the hot gases are passed along through the regenerator Rg to donate some of their heat to the incoming air and they then pass through the muffler or noise damper ND and are exhausted below the body of the car.

From the gear box GB the mechanical energy produced by the turbine Te can be transmitted to the compressor Cr and to the rear wheels. By the methods listed above control can be readily exercised over the amount of power transmitted to the wheels or to the compressor.

If one stage of the turbine is connected to the compressor and the other stage is connected to the mechanical drive for the wheels then an improved control characteristic can be obtained by virtue of the fact that when for example, the car is not supplying any power to the wheels all the power can be fed to the compressor drive which is thus automatically accelerated without changing the fuel consumption, so that when the car is again started and rapid acceleration is required, the high speed compressor is ready to deliver an increased volume of air to support the high combustion level required in the turbine chamber to produce rapid acceleration. Phase shift can simply be applied to the two blades in the manner described above to give the optimum running conditions for the compressor and the wheel drive.

With the improved cooling efficiency, higher turbine inlet temperatures can be employed for better thermal efficiency and hence better overall efficiency of the turbine unit. Also the simple layout permits the use of a low grade fuel with improved operating economy.

I claim:

1. In a turbine mechanism for converting at least a portion of the kinetic energy of a stream of hot gases into mechanical energy including means for generating a stream of hot gases and means for discharging the gases after the extraction therefrom of at least a portion of their kinetic energy, a turbine unit comprising a turbine casing, means defining at least one generally tubular turbine chamber in said casing, diametrically opposed portions of the surface of said chamber being generally formed as arcs of a common circle substantially throughout the length of said chamber transverse to the direction of flow of said stream, a single turbine blade mounted in said chamber for rotation about a longitudinal axis, said axis being coincident throughout its length with the centre of said circle, the profile of said blade in cross-section transverse to said longitudinal axis being that of two substantially identical, shallow arcs subtending a common chord which is bisected by said longitudinal axis of rotation of said blade, the length of said chord being only slightly less than the diameter of said circle, thereby substantially closing said chamber over a range of the angular rotation of said blade; an inlet passage in communication with said turbine chamber along at least a portion of its length, the point of maximum constriction of gases into said chamber, means for constricting the cross sectional area of said inlet passage over a portion of its length, the point of maximum construction being located adjacent said turbine chamber, said inlet passage being so positioned as to discharge said gases into said chamber at an angle whereby said gases impinge directly upon said blade whilst said blade is rotating through said closed chamber range of angular rotation and being so dimensioned as to cause said gases to so impinge substantially on one radius of said blade when so rotating; and an outlet passage in communication with said turbine chamber along at least a portion of the length thereof whereby to conduct said stream of gas from said chamber, said outlet passage having a minimum cross sectional area which is greater than the cross sectional area at the point of maximum constriction in said inlet passage.

2. A turbine unit according to claim 1 wherein said inlet passage is of decreasing cross-section in the direction of said chamber; and said outlet passage is of increasing cross-section in the direction away from said chamber.

3. A turbine unit according to claim 1 which further includes means for cooling said casing comprising means defining a void in said casing surrounding said chamber but not in communication with said chamber, an inlet part in said casing in communication with said void, and an outlet part in said casing in communication with said outlet passage and said void whereby to allow coolant to enter said casing, remove heat from the walls of said chamber and be discharged into said outlet passage.

4. A turbine unit according to claim 1 wherein said blade has a void formed therein, and said blade mounting means include means for supplying a flow of coolant to said void, and means for discharging said coolant from said void.

5. A turbine unit according to claim 4 wherein said coolant is vaporized in said void and said discharging means comprise jets formed in said blade in communicaton with said void and positioned and directed whereby to cause said vaporized coolant or discharge to assist the rotation of said blade.

6. An energy conversion device for converting at least a portion of the kinetic energy possessed by a moving stream of a fluid medium into mechanical energy comprising a casing, means defining a flow passage for said moving stream through said casing, means for constricting the cross sectional area of said flow passage over a portion of the length thereof, means defining a chamber in an inner flow surface of said constriction, said means being located adjacent to but downstream from the point of maximum constriction of said flow passage, a single, straight turbine blade rotatably mounted in said chamber for rotation about the longitudinal axis passing through said blade, the profile of said blade in cross section transverse to said longitudinal axis being that of two substantially identical, shallow arcs subtending a common chord which is bisected by said longitudinal axis, said axis being transverse to the direction of flow of said moving stream and parallel to the mean plane of said flow surface adjoining said chamber, said blade having at least one position of its angular rotation whereat one edge of said blade projects into said moving stream of said fluid medium and a second position whereat said blade is contained substantially entirely within said chamber, whereby said stream on flowing over said blade is effective to cause said blade in rotating to experience successively aerodynamic lift, dynamic and static pressure forces each tending to rotate said member and sufficient in the aggregate to sustain continuous rotation of said blade in the direction of flow of said fluid medium.

7. An energy conversion device for converting at least a portion of the kinetic energy possessed by a moving stream of a fluid medium into mechanical energy comprising a casing, means defining a flow passage for said moving stream through said casing, means for constricting the cross sectional area of said flow passage over a portion of the length thereof, means defining a chamber in an inner flow surface of said constriction, said means being located adjacent to but downstream from the point of maximum constriction of said flow passage, a single, straight turbine blade rotatably mounted in said chamber for rotation about the longitudinal axis passing through said blade, the profile of said blade in cross section transverse to said longitudinal axis being that of two substantially identical, shallow arcs subtending a common chord which is bisected by said longitudinal axis, said axis being transverse to the direction of flow of said moving stream and parallel to the mean plane of said flow surface adjoining said chamber, said blade having at least one position of its angular rotation whereat one edge of said blade projects into said moving stream of said fluid medium and a second position whereat said blade is contained substantially entirely within said chamber, whereby said stream on flowing over said blade is effective to cause said blade in rotating to experience successively aerodynamic lift, dynamic and static pressure forces each tending to rotate said member and sufficient in the aggregate to sustain continuous rotation of said blade in the direction of flow of said fluid medium, said blade being so dimensioned and positioned as to substantially close said passage in said at least one position, whereby to cause said moving stream to impinge substantially normally upon said blade substantially only to one side of said longitudinal axis when said blade is in said passage closing position.

8. In a turbine mechanism for converting at least a portion of the kinetic energy possessed by a moving stream or a fluid medium into mechanical energy including means for generating such a moving stream and means for discharging the fluid medium after such energy conversion, a turbine unit comprising a turbine casing, means defining a flow passage for said moving stream through said casing, means for constricting the cross sectional area of said flow passage over a portion of its length, means defining a turbine chamber in an inner flow surface of said constriction, said means being located adjacent to but downstream from the point of maximum constriction of said flow passage, a single, straight turbine blade, means for mounting said blade in said chamber for rotation about the longitudinal axis passing through said blade, the profile of said blade in cross section transverse to said longitudinal axis being that of two substantially identical, shallow arcs subtending a common chord which is bisected by said longitudinal axis, said axis transverse to the direction of flow of said moving stream through said flow passage, said blade and said flow passage being so dimensioned that said blade in a first position of its angular rotation is contained substantially entirely within said turbine chamber and in a second position displaced from said first position, is effective to substantially prevent the passage of said stream through said flow passage whereby said stream on flowing over said blade is effective to cause said blade in rotating to experience successively aerodynamic lift, dynamic and static pressure forces each tending to rotate said member and sufficient in the aggregate to sustain continuous rotation of said blade in the direction of flow of said fluid medium.

9. In a turbine mechanism for converting at least a portion of the kinetic energy possessed by a moving stream of a fluid medium into mechanical energy including means for generating such a moving stream and means for discharging the fluid medium after such energy conversion, a turbine unit comprising a turbine casing, means defining a turbine chamber in said casing, inlet and outlet passages formed in said casing in communication with said chamber on opposed sides thereof whereby to provide a flow passage for said fluid medium through said casing, means for constricting the cross sectional area of said inlet passage over a portion of its length adjacent said turbine chamber, the point of maximum constriction being located immediately adjacent said turbine chamber, a single, straight turbine blade, means for mounting said blade in said chamber for rotation about the longitudinal axis passing through said blade, the profile of said blade in cross section transverse to said longitudinal axis being that of two substantially identical, shallow arcs subtending a common chord which is bisected by said longitudinal axis, said axis transverse to the direction of flow of said moving stream through said flow passage, said blade and said inlet and outlet passages being so dimensioned that said blade in a first position of its angular rotation has its outer edges contiguous with the common flow surface respectively of said inlet passage and said outlet passage whereby to form an unimpeded flow passage of constantly and smoothly increasing cross sectional area in a downstream direction from said point of maximum constriction and in a second position displaced from said first position is effective to substantially prevent the passage of said stream through said portion of said turbine chamber.

10. An energy conversion device for converting at least a portion of the kinetic energy possessed by a moving stream of a fluid medium into mechanical energy comprising a casing, means defining a flow passage for said moving stream through said casing, means for constricting the cross sectional area of said flow passage over a portion of the length thereof, means defining a chamber in an inner flow surface of said constriction, said means being located adjacent to but downstream from the point of maximum constriction of said flow passage, a single, straight turbine blade rotatably mounted in said chamber for rotation about the longitudinal axis passing through said blade, the pofile of said blade in cross section transverse to said longitudinal axis being that of two obtuse angled, isosceles triangles having a common base bisected by said longitudinal axis, said axis being transverse to the direction of flow of said moving stream and parallel to the mean plane of said flow surface adjoining said chamber, said blade having at least one position of its angular rotation whereat one edge of said blade projects into said moving stream of said fluid medium and a second position whereat said blade is contained substantially entirely within said chamber, whereby said stream on flowing over said blade is effective to cause said blade in rotating to experience successively, aerodynamic lift, dynamic and static pressure forces each tending to rotate said member and sufficient in their aggregate to sustain continuous rotation of said blade in the direction of flow of said fluid medium.

11. An energy conversion device for converting at least a portion of the kinetic energy possessed by a moving stream of a fluid medium into mechanical energy comprising a casing, means defining a flow passage for said moving stream through said casing, means for constricting the cross sectional area of said flow passage over a portion of the length thereof, means defining a chamber in an inner flow surface of said constriction, said means being located adjacent to but downstream from the point of maximum constriction of said flow passage, a single, straight turbine blade rotatably mounted in said chamber for rotation about the longitudinal axis passing through said blade, the profile of said blade in cross section transverse to said longitudinal axis being of a modified S-shape.

which is bisected by said longitudinal axis, said axis being transversed to the direction of flow of said moving stream and parallel to the mean plane of said flow surface adjoining said chamber, said blade having at least one position of its angular rotation whereat one edge of said blade projects into said moving stream of said fluid medium and a second position whereat said blade is contained substantially entirely within said chamber, whereby said stream on flowing over said blade is effective to cause said blade in rotating to experience successively, aerodynamic lift, dynamic and static pressure forces each tending to rotate said member and sufficient in their aggregate to sustain continuous rotation of said blade in the direction of flow of said fluid medium.

12. In a turbine mechanism for converting at least a portion of the kinetic energy possessed by a moving stream of a fluid medium into mechanical energy including means for generating such a moving stream and means for discharging the fluid medium after such energy conversion, a turbine unit comprising a turbine casing, means defining a turbine chamber in said casing, inlet and outlet passages formed in said casing in communication with said chamber on opposed sides thereof whereby to provide a flow passage for said fluid medium through said casing, means for constricting the cross sectional area of said inlet passage over a portion of its length adjacent said turbine chamber, the point of maximum constriction being located immediately adjacent said turbine chamber, a single straight blade, means for mounting said blade in said chamber for rotation about the longitudinal axis passing through said blade, the profile of said blade being that of two obtuse angled, isosceles triangles having a common base bisected by said longitudinal axis, said axis being transverse to the direction of flow of said moving stream through said flow passage, said blade and said inlet and outlet passages being so dimensioned that said blade in a first position of its angular rotation has its outer edges contiguous with the common flow surface respectively of said inlet passage and said outlet passage whereby to form an unimpeded flow passage of constantly and smoothly increasing cross sectional area in a downstream direction from said point of maximum constriction and in a second position displaced from said first position is effective to substantially prevent the passage of said stream through said portion of said turbine chamber.

13. In a turbine mechanism for converting at least a portion of the kinetic energy possessed by a moving stream of a fluid medium into mechanical energy including means for generating such a moving stream and means for discharging the fluid medium after such energy conversion, a turbine unit comprising a turbine casing, means defining a turbine chamber in said casing, inlet and outlet passages formed in said casing in communication with said chamber on opposed sides thereof whereby to provide a flow passage for said fluid medium through said casing, means for constricting the cross sectional area of said inlet passage over a portion of its length adjacent said turbine chamber, the point of maximum constriction being located immediately adjacent said turbine chamber, a single straight blade, means for mounting said blade in said chamber for rotation about the longitudinal axis passing through said blade, the profile of said blade being that of a modified S-shape which is bisected by said longitudinal axis, said axis being transverse to the direction of flow of said moving stream through said flow passage, said blade and said inlet and outlet passages being so dimensioned that said blade in a first position of its angular rotation has its outer edges contiguous with the common flow surface respectively of said inlet passage and said outlet passage whereby to form an unimpeded flow passage of constantly and smoothly increasing cross sectional area in a downstream direction from said point of maximum constriction and in a second position displaced from said first position is effective to substantially prevent the passage of said stream through said portion of said turbine chamber.

References Cited in the file of this patent

UNITED STATES PATENTS

| | | |
|---|---|---|
| 118,840 | Briggs et al. | Sept. 12, 1871 |
| 807,435 | Burgman | Dec. 19, 1905 |
| 1,973,509 | Santarsiero | Sept. 11, 1934 |
| 2,015,059 | Christiansen | Sept. 24, 1935 |
| 2,471,109 | Hunt | May 24, 1949 |
| 2,647,368 | Triebbnigg et al. | Aug. 4, 1953 |
| 2,945,671 | Petrie | July 19, 1960 |

FOREIGN PATENTS

| | | |
|---|---|---|
| 11,411 | Great Britain | May 31, 1905 |
| 424,140 | Great Britain | Feb. 15, 1935 |